United States Patent Office 3,359,238
Patented Dec. 19, 1967

3,359,238
THIOCARBONATE-CARBONATE COPOLYMERS
Eugene P. Goldberg, Highland Park, and Frank Scardiglia, Arlington Heights, Ill., assignors to Borg-Warner Corporation, Chicago, Ill., a corporation of Illinois
No Drawing. Filed Apr. 3, 1962, Ser. No. 184,656
2 Claims. (Cl. 260—47)

This invention relates in general to linear condensation copolymers. More specifically, this invention is directed to polyester copolymers derived from diphenols, thiocarbonate and carbonate group precursors, such as thiophosgene or bisthiochloroformates, and phosgene or bischloroformates respectively, and to their method of preparation.

Polyesters derived from diphenols and phosgene are known in the art. While they demonstrate properties which are of value in various commercial applications, they do not possess the highly desirable combination of properties, such as high heat distortion temperatures, excellent chemical stability and strength properties, inherent in the carbonate-thiocarbonate polyesters of the present invention. The new thiocarbonate-carbonate copolymer compositions herein described and claimed also possess desirable properties, such as high tensile strength and good impact and flexural strength. Also, they can be selectively formulated so as to exhibit a wide range of softening temperatures, viscosities, etc. and are a more versatile class of compounds than the polycarbonate homopolymers. Due to their unique properties, such as high heat distortion temperatures, high melting points and exceptional chemical stability, they are especially adapted for use in the polymer field as films, fibers, molded parts, protective coatings, adhesives, etc.

The compositions of the present invention comprise new linear copolyesters containing structural units derived from one or more diphenols reacted with one or more bisthiochloroformates and/or thiophosgene and one or more bischloroformates and/or phosgene. The aliphatic or aromatic carbonate ester and thiocarbonate ester structural units formed thereby occur in various fashions in the linear copolymer chain. More specifically, the linear copolymers of the present invention are comprised of recurring (1) thiocarbonate ester structural units of the formula

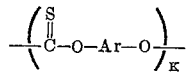

Formula I or

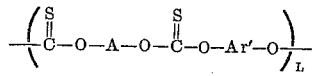

Formula Ia and (2) carbonate ester structural units of the formula

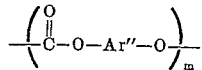

Formula II or

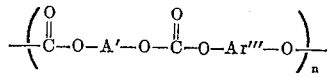

Formula IIa

In thiocarbonate Formulas I and Ia and carbonate Formulas II and IIa the Ar, Ar', Ar" and Ar''' groups are bivalent aromatic carbocyclic containing groups and A and A' are bivalent organic radicals selected from the group consisting of (a) aromatic carbocyclic containing groups, (b) aliphatic containing groups and (c) aliphatic-aromatic containing groups. Further (a), (b) and (c) may contain hetero atoms other than carbon. Sub K, L, $m$ and $n$ of Formulas I, Ia, II and IIa are integers equal to or greater than one, and Ar, Ar', Ar", Ar''', A and A' may be the same. The copolymers of this invention may be of a random type in which the above mentioned structural units are propagated along the copolymer chain in a random manner, or they may be block copolymers in which one or both of the structural units is itself polymeric, as for example, where K or L and/or $m$ or $n$ are substantially greater than one. Such structures may be achieved, for example, by the formation of a polythiocarbonate from thiophosgene and at least one diphenol followed by addition of phosgene and further polycondensation. It is apparent that block structures themselves are susceptible to regular or random arrangements as indicated by the method of preparation.

The composition of the present invention comprises linear condensation copolymers preferably prepared under interfacial polycondensation conditions from one or more diphenols, one or more bisthiochloroformates and/or thiophosgene and one or more bischloroformates and/or phosgene. Essentially any dihydric phenol is useful in the practice of this invention. The diphenol may be generally represented by Formula III:

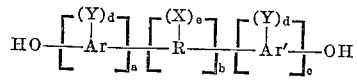

Formula III wherein R is an alkylene, alkylidene or cycloaliphatic linkage, e.g., methylene, ethylene, propylene, isopropylene, isopropylidene, butylene, isobutylene, amylene, cyclohexylene cyclopentylidene, etc.; a linkage selected from the group consisting of ether; carbonyl; amino; a sulfur containing linkage, e.g., sulfide, sulfoxide, sulfone; a silicon containing linkage, e.g., silane or siloxy; a phosphorus containing linkage; etc. R can also consist of two or more alkylene or alkylidene linkages connected by such groups as aromatic, amino, ether, carbonyl, silane, siloxy, sulfide, sulfoxide, sulfone, a phosphorus containing linkage, etc. Other groups which are represented by R will occur to those skilled in the art.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic, or organometallic radicals. The substituents represented by Y include (1) halogen, e.g., chlorine, bromine, fluorine or (2) ether groups of the general formula OE, where E is a monovalent hydrocarbon radical similar to X or (3) monovalent hydrocarbon groups of the type represented by R or (4) other substituents, e.g., nitro, cyano, etc., said substituents being essentially inert to the polymerization reaction environment.

X is a monovalent hydrocarbon group exemplified by the following: alkyl, such as methyl, ethyl, propyl, isopropyl, butyl, decyl, etc.; aryl groups, such as phenyl, naphthyl, biphenyl, xylyl, tolyl, etc.; aralkyl groups, such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

$d$ is a whole number ranging from 0 to a maximum equivalent to the number of replaceable hydrogens substituted on the aromatic rings comprising Ar or Ar'. $e$ is a whole number ranging from 0 to a maximum controlled by the number of replaceable hydrogens on R. *a*, *b*, and *c* are whole numbers including 0. When *b* is not 0, neither *a* nor *c* may be 0. Otherwise either *a* or *c*, but not both, may be 0. Where *b* is 0 in Formula III, the aromatic groups are joined by a direct bond between the carbocyclic ring carbon atoms with no connecting alkyl or other linkage.

The hydroxyl and Y substituents on the aromatic groups, Ar and Ar', can be varied in the ortho, meta or para positions on the aromatic rings and the groups can be in any possible geometric relationship with respect to one another.

Formula III for the diphenols may also be more generally and conveniently depicted by Formula IV, wherein the aromatic carbocyclic group D represents all of the Formula III molecule except the hydroxyl functions:

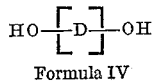

Formula IV

Examples of difunctional phenols that are useful in the practice of this invention include disphenols of which the following are representative: 2,2 - bis - (4 - hydroxyphenyl) - propane (Bisphenol - A); bis - (2 - hydroxyphenyl) - methane; bis - (4 - hydroxyphenyl) - methane; 1,1 - bis - (4 - hydroxyphenyl) - ethane; 1,2 - bis - (4 - hydroxyphenyl) - ethane; 1,1 - bis - (3 - chloro - 4 - hydroxyphenyl) - ethane; 1,1 - bis - (3,5 - dimethyl - 4 - hydroxyphenyl) - ethane; 2,2 - bis - (3 - phenyl - 4 - hydroxyphenyl) - propane; 2,2 - bis - (4 - hydroxynaphthyl) - propane; 2,2 - bis - (4 - hydroxyphenyl) - pentane; 2,2 - bis - (4 - hydroxyphenyl) - hexane; bis - (4 - hydroxyphenyl) - phenylmethane; bis - (4 - hydroxyphenyl) - cyclohexylmethane; 1,2 - bis - (4 -hydroxyphenyl) - 1,2 - bis - (phenyl) - ethane; 2,2 - bis - (4 - hydroxyphenyl) - 1 - phenylpropane; bis - (3 - nitro - 4 - hydroxyphenyl) - methane; bis - (4 - hydroxy - 2,6 - dimethyl - 3 - methoxyphenyl) - methane; 2,2 - bis - (3,5 - dichloro - 4 - hydroxyphenyl) - propane; 2,2 - bis (3 - bromo - 4 - hydroxyphenyl) - propane.

The preparation of these and other applicable bisphenols is known in the art. They are most commonly prepared by condensation of two moles of a phenol with a single mole of a ketone or aldehyde.

Also useful are dihydroxybenzenes typified by hydroquinone and resorcinol; dihydroxybiphenyls, such as 4,4' - dihydroxybiphenyl, 2,2' - dihydroxybiphenyl, 2,4' - dihydroxybiphenyl; and dihydroxynaphthalenes, such as 2,6 - dihydroxynaphthalene, etc.

Dihydroxyaryl sulfones are also useful, such as bis - (4 - hydroxyphenyl) - sulfone; 2,4' - dihydroxyphenyl sulfone; 2,4' - dihydroxy - 5' - chlorophenyl sulfone; 3' - chloro - 4,4' - dihydroxyphenyl sulfone; bis - (4 - hydroxyphenyl) - biphenyl disulfone; etc. The preparation of these and other useful dihydroxyarylsulfones is described in United States Patent 2,288,282 issued to Huissmann. Polysulfones as well as sulfones substituted with halogen, nitro, alkyl and other substituents are also useful. In addition, related sulfides and sulfoxides are applicable.

Dihydroxyaromatic ethers are useful and may be prepared by methods found in United States Patent 2,739,171 issued to Linn and in "Chemical Reviews," 38, 414–417 (1946). Typical of such dihydroxyaryl ethers are the following: 4,4' - dihydroxyphenyl ether; 4,4' - dihydroxy - 2,6 - dimethylphenyl ether; 4,4' - dihydroxy - 3,3' - diisobutylphenyl ether; 4,4' - dihydroxy - 3,3' - diisopropylphenyl ether; 4,4' - dihydroxy - 3,2' - dinitrophenyl ether; 4,4' - dihydroxy - 3,3' - dichlorophenyl ether; 4,4' - dihydroxynaphthyl ether; etc. The many other types of suitable dihydroxyaryl compounds will be apparent to those skilled in the art.

The thiocarbonate and carbonate group precursors most conveniently used in the practice of the present invention are thiophosgene ($CSCl_2$) and phosgene ($COCl_2$) and alkyl, aryl or alkaryl bisthiochloroformates and bischloroformates. The bisthiochloroformates and bischloroformates may be generally represented by Formulas V and Va respectively:

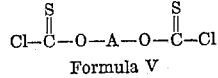

Formula V

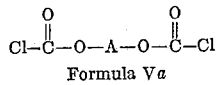

Formula Va and are most usually prepared by the reaction of thiophosgene or phosgene with a dihydroxy compound as shown in the following equations:

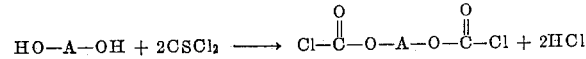

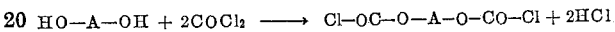

A in Formulas V and Va may be an alkylene, alkylidene or cycloaliphatic group as defined for R in Formula III: an alkylene, alkylidene or cycloaliphatic group containing ethylenic unsaturation; an aromatic group such as phenylene, naphthylene, biphenylene, substituted phenylene, etc.; two or more aromatic groups connected through non-aromatic groups such as those defined by R in Formula III; or an aralkyl group such as tolylene, xylylene, etc.

Aliphatic bisthiochloroformates and bischloroformates are those in which the two oxygen atoms of the chloroformate functions are bonded directly to aliphatic carbon atoms in A of Formulas V and Va and are exemplified by bisthiochloroformates and bischloroformates of the following dihydroxy compounds: ethylene glycol; diethylene glycol; thiodiglycol; ethylene dithiodiglycol; 1,2-propanediol; 1,3-propanediol; 1,2-butanediol; 1,3-butanediol; 1,4-butanediol; 2,3-butanediol; 2,2-dimethyl-1,3-propanediol; 2-methyl-2-ethyl-1,3-propanediol; 1,5-pentanediol; 2-ethyl-1,3-propanediol; 1,6-hexanediol; 1,7-heptanediol; 1,8-octanediol; 1,10-decanediol; 1,2-cyclopentanediol; 1,2-cyclohexanediol; o-, m-, and p-xylyleneglycol; 2,2-bis-(4-hydroxycyclohexyl)-propane; 1,5- and 2,7-dihydroxydecahydronaphthalene; 2,2,4,4-tetramethyl-1,3-cyclobutanediol; all the glycols which are produced by the polymerization of epoxides, such as ethylene oxide, propylene oxide, styrene oxide, etc.

Examples of aliphatic-aromatic bisthiochloroformates and bischloroformates are those in which one of the oxygen atoms of the chloroformate function is bonded directly to an aliphatic carbon atom and one linked to an aromatic carbon atom in A in Formulas V and Va and are exemplified by the bisthiochloroformates and bischloroformates of the following compounds: 2-(4-hydroxyphenyl)-ethanol; 2-(3-hydroxyphenyl) - ethanol; 2-(2-hydroxyphenyl)-ethanol and diphenols that have been reacted with one mole of an epoxide to produce an hydroxyalkyl group. Monohydroxyethylated diphenols are compounds that are useful and may be represented by the following formula:

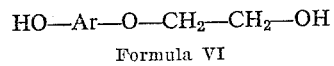

Formula VI in which Ar is an aromatic radical as hereinbefore described.

Bisthiochloroformates and bischloroformates derived from diphenols, such as those diphenols hereinbefore described in relation to Formula IV, may also be used. Numerous other suitable bisthiochloroformates and bischloroformates will occur to those skilled in the art.

It is to be noted that in the preparation of the copolymers of this invention using thiophosgene and phosgene as the thiocarbonate and carbonate linkage precursors respectively, "in situ" formation of the hydroxy compound mono- and bisthiochloroformates and mono- and bischloroformates takes place as one step in the polymer forming sequence of reactions. The mode and stoichiometry of reactant addition will influence the extent of "in situ" bisthiochloroformate and/or bischloroformate production, e.g., using a thiophosgene to diphenol mole ratio of 2:1 and adding the diphenol to thiophosgene, the predominant intermediate is the bisthiochloroformate and using a phosgene to diphenol mole ratio of 2:1 and adding the diphenol to phosgene, the predominant intermediate is the bischloroformate.

Although the materials of this invention may be prepared by conventional condensation procedures, it is preferred to conduct the polycondensation via an interfacial polymerization technique. Polymerizations may be carried out at or near room temperature by mixing a basic aqueous solution of an alkali metal salt of at least one diphenol with one or more bisthiochloroformates and/or thiophosgene and bichloroformates and/or phosgene contained in an inert organic solvent. The addition of a basic organic catalyst such as a quaternary ammonium salt or a suitable amine is useful in promoting the higher molecular weights. The reaction mixtures are preferably stirred vigorously for varying periods of time and the copolymers precipitated or coagulated by any suitable means, as for example, by addition to a nonsolvent such as isopropyl alcohol. The precipitated copolymers are generally washed to remove any residual impurities and dried.

The organic solvent utilized for the bisthiochloroformates and/or thiophosgene-bischloroformates and/or phosgene mixture may be any inert organic solvent which preferably also has some solvent power with respect to the polymer formed. Typical of such solvents are methylene chloride, tetrachloroethylene, tetrachloroethane, chloroform, carbon tetrachloride, o-dichlorobenzene, etc. The concentration of reactants in the aqueous and organic phases may vary over a relatively wide range, from less than one weight percent to more than 20 weight percent, being limited at the high concentrations only by the increasing difficulties encountered in handling the extremely viscous media encountered. Polymerization time may be varied from less than five minutes to more than three hours depending upon the reactivity of the copolymer reactants and the molecular weight desired. Extremely short polymerization periods will generally result in lower molecular weight copolymers as compared with longer polymerization times which give higher molecular weights. Although it is preferred to use approximately equal molar quantities of the diphenols, bisthiochloroformates and/or thiophosgene and bischloroformates and/or phosgene, the reactivity of the bisthiochloroformates and/or thiophosgene and bischloroformates and/or phosgene and the reaction conditions are such that the use of exact stoichiometry is not critical to the attainment of relatively high molecular weights. Thus, in fact, block copolymers are readily obtained using incremental reactant addition. The mode of addition of the bisthiochloroformates and/or thiophosgene and bischloroformates and/or phosgene to the diphenols is therefore governed by the nature of the copolymer desired and it is possible to add incrementally or to batch-mix the reactants if desired. The various bisthiochloroformates and/or thiophosgene and bischloroformates and/ or phosgene need not be added together but may be added one at a time or as alternate increments, again depending upon the polymer structure sought, i.e., random, random-block, block-block, etc. In addition, it is also possible to invert the order of addition of reactants and add the diphenols to the bisthiochloroformates and/or thiophosgene and bischloroformates and/or phosgene.

Although random copolymers (consisting of structural units propagated along the polymer chain in an essentially random fashion) are readily prepared, block copolymers of tailored structure may also be easily prepared (in which at least one of the structural units in the copolymer chain is itself polymeric.) The diphenol-bisthiochloroformate and/or thiophosgene-bischloroformate and/or phosgene reaction is a particularly convenient method for the preparation of block copolymers. Thus, block copolymers may be prepared, for example, by reacting at least one bisthiochloroformate initially with at least one dihydric phenol followed by reaction with phosgene or at least one bischloroformate. Alternately, phosgene or at least one bischloroformate may be reacted with at least one diphenol followed for further reaction with at least one bisthiochloroformate. Similarly, block-block structures may be prepared, as for example, by mixing a polymeric diphenol-phosgene reaction mixture and a polymeric diphenol-bisthiochloroformate reaction mixture with or without further addition of thiocarbonate precursors or phosgene or diphenols.

The basic organic catalyst also may be added initially or during the course of the polycondensation. The catalyst may also be added incrementally during the course of the polycondensation. Although benzyltrimethyl-ammonium chloride is a particularly effective catalyst, other quaternary salts and suitable amines are effective. The amount of catalyst added may vary from less than .01 weight percent to more than 1.0 weight percent. Although the polymerization temperature may be varied over a wide range, as for example, from less than 0° C. to more than 100° C., it is more convenient to conduct the reaction at or about room temperature, i.e. 25° C.

It will be seen that the polycondensation of one or more diphenols with one or more bisthiochloroformates and/or thiophosgene and one or more bischloroformates and/or phosgene will yield a copolymer typically represented by unit structure Formulas VII, VIII, and VIIIa hereinafter set forth wherein the various symbols have the same meaning as hereinafter indicated and where the number of unit structures is dependent on the number of different diphenols, bisthiochloroformates and/or thiophosgene and bischloroformates and/or phosgene involved in the copolymer preparation.

The use of one or more bisthiochloroformates and/or thiophosgene and one or more bischloroformates and/or phosgene results in copolymer compositions whose properties may be widely varied according to the structure and relative proportions of the bisthiochloroformates and/or thiophosgene and bischloroformates and/or phosgene. The relative proportions of the two ingredients may be widely varied such that the thiocarbonate precursors may constitute less than five mole percent or in excess of 95 mole percent of the total thiocarbonate precursor-carbonate precursor mix.

A copolymer derived from at least one diphenol, at least one bisthiochloroformate and/or thiophosgene and at least one bischloroformate and/or phosgene, therefore, will comprise the following formulas: (VII and/or VIIa) thiocarbonate ester structural units and (VIII and/or VIIIa) carbonate ester structural units in the polymer chain—

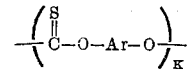

Formula VII

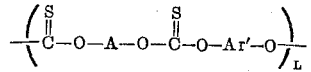

Formula VIIa

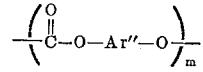

Formula VIII

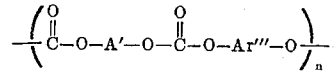

Formula VIIIa wherein the radicals Ar, Ar', Ar", and Ar'" are bivalent aromatic carbocyclic containing groups and A and A' are bivalent organic radicals selected from the group consisting of (a) aromatic carbocyclic containing groups, (b) aliphatic containing groups and (c) aliphatic-aromatic containing groups. Further (a), (b) and (c) may contain hetero atoms other than carbon. Sub $K$, $L$, $m$ and $n$ are integers equal to or greater than one, and Ar, Ar', Ar", Ar'", A and A' may be the same or different. It is to be noted that (1) the aromatic carbocyclic containing groups Ar, Ar', Ar", and Ar'" are derived from diphenols and are bonded through aromatic ring carbon atoms to thiocarbonate or carbonate group linking oxygen atoms and (2) the aliphatic or aromatic carbocyclic containing groups A and A' are derived from aliphatic or aromatic bisthiochloroformates and bischloroformates and are bonded directly through aliphatic carbon atoms or aromatic ring carbon atoms to carbonate group oxygen atoms.

The following examples are illustrative of the preparation of thiocarbonate-carbonate copolymers from diphenols, bisthiochloroformates and/or thiophosgene and bischloroformates and/or phosgene.

EXAMPLE I

*Reaction of thiophosgene and phosgene with bisphenol-A and 4,4'-dihydroxydiphenyl ether*

(A) Thiophosgene (3.25 g.; 28.3 mmole; 65 mole percent) and 1.41 g. (14.2 mmole; 35 mole percent) of phosgene in 150 ml. of methylene chloride were added at 6° C. to a well-stirred solution of 8.55 g. (37.5 mmole; 90 mole percent) of Bisphenol-A, 0.848 g. (4.2 mmole; 10 mole percent) of 4,4'-dihydroxyphenyl ether, 85.9 mmole of NaOH and eight drops of a 60 percent aqueous solution of benzyltrimethylammonium chloride in 125 ml. of water. The reaction mixture was stirred for 1½ hours, then the polymer was coagulated by addition of the reaction mixture to isopropyl alcohol. The product was thoroughly washed with isopropyl alcohol and water and dried in vacuo. The polymer had an intrinsic viscosity, measured in 1,1,2,2-tetrachloroethane at 25° C., of 0.61 dl./g. The heat distortion temperature of a small injection molded bar was 151° C.

(B) The reaction conditions and the manner of isolation of the product are the same as in Example I(A), except that 2.8 g. of phosgene (28.3 mmole; 65 mole percent) and 1.63 g. of thiophosgene (14.2 mmole; 35 mole percent) were used. The intrinsic viscosity of the polymer was 0.84 dl./g. Its heat distortion temperature was 145° C.

EXAMPLE II

*Reaction of thiophosgene and phosgene with bisphenol-A*

(A) Thiophosgene (1.73 g., 15 mmole, 50 mole percent) and 1.49 g. (15 mmole, 50 mole percent) of phosgene in 200 ml. of methylene chloride were added at 5° C. to a well-stirred solution of 6.83 g. (30 mmole, 100 mole percent) of Bisphenol-A, 66 mmole of NaOH and eight drops of a 60 percent aqueous solution of benzyltrimethylammonium chloride in 150 ml. of water. The reaction mixture was stirred for 1¼ hours, then the polymer was coagulated by addition of the reaction mixture to isopropyl alcohol. The product was thoroughly washed with isopropyl alcohol and water and dried in vacuo. The polymer had an intrinsic viscosity, measured in 1,1,2,2-tetrachloroethane at 25° C., of 0.41 dl./g.

(B) The reaction conditions and the manner of isolation of the product are the same as in Example I(A), except that 3.11 g. (27 mmole, 90 mole percent) of thiophosgene and 0.297 g. (3 mmole, 10 mole percent) of phosgene were used. The intrinsic viscosity of the polymer was 0.90 dl./g.

The physical properties of Examples II(A) and II(B) are summarized below:

|  | Example II(A) | Example II(B) |
|---|---|---|
| Yield strength, p.s.i., 25° C | 8,000 | 9,000 |
| Ultimate tensile strength, p.s.i., 25° C | 8,500 | 8,300 |
| Percent Elongation, 25° C | 97 | 31 |
| Yield strength, p.s.i., 100° C | 5,800 | 5,500 |
| Ultimate tensile strength, p.s.i., 100° C | 6,000 | 7,400 |
| Percent Elongation, 100° C | 95 | 120 |
| Dielectric constant, $10^2$ c.p.s | 3.11 | 2.66 |
| Dielectric constant, $10^3$ c.p.s | 3.04 | 2.74 |
| Dielectric constant, $10^5$ c.p.s | 3.01 | 2.69 |
| Dissipation factor, $10^2$ c.p.s | 0.0030 | 0.0023 |
| Dissipation factor, $10^3$ c.p.s | 0.0014 | 0.0013 |
| Dissipation factor, $10^5$ c.p.s | 0.0030 | 0.0025 |
| Compression molding temp., ° C | 220 | 235 |
| Heat distortion temp., (264 p.s.i. load) ° C | 159 | 168 |
| Impact strength, kg. cm./cm.$^2$ | 9.6 | 15.5 |

The presence of aromatic thiocarbonate linkages along the chain of linear polyesters leads to a considerable improvement in the hydrolytic stability of the polymers. Aromatic thiocarbonate homo- and copolymers are considerably more stable toward hydrolysis than polyurethanes, polycarbonates and aromatic polyesters; most of them are even more stable to basic hydrolysis than polyamides (which are considered stable to base but unstable to acid hydrolysis).

In the following table the hydrolytic stability of molded bars ½" x ¼" x ⅛" is compared with that of other polymers. For this test of hydrolytic stability, samples were refluxed for 20 hours in ten percent aqueous sodium hydroxide and weight loss measured.

|  | Percent weight loss (20 hours in refluxing ten percent NaOH) |
|---|---|
| Polyurethane (Texin [a]) | 100.0 |
| Bisphenol-A Polycarbonate (Lexan [b] and Merlon [a]) | 18.7 |
| Nylon-66 (Zytel [c]) | 1.8 |
| Poly(Bisphenol-A Isophthalate) | 22.1 |
| Reaction Product of Example II(A) | 3.8 |
| Reaction Product of Example II(B) | 1.0 |

[a] Trademark of Mobay Chemical Company.
[b] Trademark of General Electric Co.
[c] Trademark of E. I. du Pont de Nemours & Co.

From the foregoing description and examples it will be apparent that the polymer compositions of this invention are inherently versatile and useful polyesters. It may also be noted that the polymer compositions have good hydrolytic stability. The combination of high softening temperature, desirable strength characteristics and thermal and chemical stability make these compositions useful as thermoplastic molding compounds for the fabrication of molded parts, gaskets, tubing, gears, casings and the like either as virgin resin or combined with such fillers as silica, carbon black, wood flour and the like. Films are useful as packaging material, containers, covers, liners, electrical insulation, recording tapes, photographic film base, pipe wrappings, etc. Films and fibers may be oriented or drawn at suitable temperatures to permit enhancement of strength properties such as tensile and flexural strengths. Fibers may be readily formed by melt or solution spinning and are useful as yarn, thread, bristle, rope and the like. The compositions of this invention may be readily pigmented or dyed and suitable stabilizers and plasticizers as are known in the art may be incorporated. Alloying or admixture with other resinous materials may also be readily accomplished. The very desirable combination of properties found in the present compositions make them also useful for surface coating in paints, varnishes and enamels and their powerful adhesive qualities render them particularly useful as adhesives for plastic, rubber, metal, glass or wood parts.

Obviously, many modifications and variations of the invention as hereinbefore set forth may be made without departing from the spirit and scope thereof, and therefore only such limitations should be imposed as are indicated in the appended claims. For example, it will be appreciated by those skilled in the art that by varying the nature of the diphenols and both the nature and the ratio of the bisthiochloroformates and/or thiophosgene and bischloroformates and/or phosgene, the physical and chemical properties of the resulting products will be affected.

We claim:

1. A linear copolymer composition having an intrinsic viscosity of at least 0.3 dl./g. when measured in 1,1,2,2-tetrachloroethane at 25° C. and a heat distortion temperature in excess of 145° C. comprising in its linear chain from about 5 to about 95 mole percent recurring thiocarbonate ester structural units of the formula

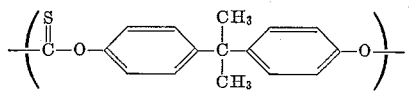

and correspondingly from about 95 percent to about 5 mole percent recurring carbonate ester structural units of the formula

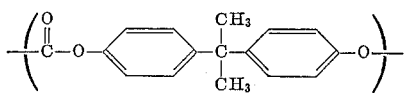

2. A linear copolymer composition having an intrinsic viscosity of at least 0.3 dl./g. when measured in 1,1,2,2-tetrachloroethane at 25° C. and a heat distortion temperature in excess of 145° C. comprising in its linear chain from about 5 to about 95 mole percent recurring thiocarbonate ester structural units selected from the groups consisting of

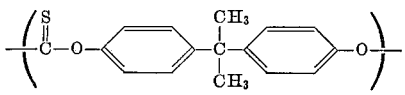

and

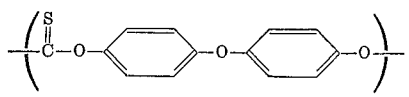

and correspondingly from about 95 to about 5 mole percent recurring carbonate ester structural units selected from the groups consisting of

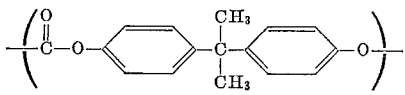

and

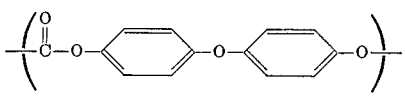

References Cited

UNITED STATES PATENTS

| 3,028,365 | 4/1962 | Schnell | 260—47 X |
| 3,030,331 | 4/1962 | Goldberg | 260—47 XR |
| 3,227,684 | 1/1966 | Conix | 260—47 |

FOREIGN PATENTS

| 597,208 | 5/1961 | Belgium. |
| 585,882 | 6/1960 | Belgium. |

OTHER REFERENCES

Kabaivanov et al., Chem. Abs., vol. 56, 5869e, March 1962, abstract of an article published in Godishnik Khim. Tekhnol. Ins., vol. 6, No. 1, pp. 37–43 (1959).

WILLIAM H. SHORT, *Primary Examiner.*

JAMES SEIDLECK, *Examiner.*

M. GOLDSTEIN, J. C. MARTIN, N. W. SHUST,
*Assistant Examiners.*